United States Patent [19] [11] 4,109,053
Aldrich [45] Aug. 22, 1978

[54] SIZING PAPER WITH STABLE DISPERSIONS OF HYDROCARBON RESINS

[75] Inventor: Paul Harwood Aldrich, Greenville, Del.

[73] Assignee: Hercules Incorporated, Wilmington, Del.

[21] Appl. No.: 640,821

[22] Filed: Dec. 15, 1975

Related U.S. Application Data

[62] Division of Ser. No. 413,065, Nov. 5, 1973, Pat. No. 3,941,736.

[51] Int. Cl.$^2$ .............................................. D21D 3/00
[52] U.S. Cl. ............................ 428/413; 162/164 EP; 427/386; 427/391
[58] Field of Search .......................... 427/386, 391; 162/164 EP; 428/413

[56] References Cited

U.S. PATENT DOCUMENTS

| 2,595,935 | 5/1952 | Daniel et al. | 427/391 X |
| 2,809,948 | 10/1957 | Hunter et al. | 162/173 X |
| 2,926,116 | 2/1960 | Keim | 162/164 EP |
| 2,926,154 | 2/1960 | Keim | 162/164 EP X |
| 3,483,077 | 12/1969 | Aldrich | 162/164 EP X |
| 3,922,243 | 11/1975 | Alrdich et al. | 162/164 EP X |
| 3,966,654 | 6/1976 | Aldrich | 162/164 EP X |

*Primary Examiner*—James R. Hoffman
*Attorney, Agent, or Firm*—Charles L. Board

[57] ABSTRACT

Disclosed are essentially stable aqueous dispersions of hydrocarbon resins which consist essentially of at least one hydrocarbon resin in finely-divided form; a water-soluble cationic resin, a specific example of which is a water-soluble cationic aminopolyamide—epichlorohydrin resin; and water. The dispersion can be used to size paper.

7 Claims, No Drawings

SIZING PAPER WITH STABLE DISPERSIONS OF HYDROCARBON RESINS

This is a division of application Ser. No. 413,065, filed Nov. 5, 1973 now U.S. Pat. No. 3,941,736.

This invention relates to novel aqueous dispersions of hydrocarbon resins. Particularly, this invention relates to aqueous dispersions which consist essentially of finely-divided particles of at least one hydrocarbon resin, a water-soluble cationic polymeric dispersing agent for the finely-divided particles, and water. The dispersing agent will be detailed more fully hereinafter. The novel dispersions of this invention are useful in the sizing of paper.

In accordance with this invention there are provided aqueous dispersions of hydrocarbon resin particles for use in the sizing of paper. The aqueous dispersions of this invention have good stability (shelf life) for prolonged periods of time of up to about 3 to 6 months.

The dispersions of this invention consist essentially of, by weight, from about 5.5 parts to about 50 parts solids and from about 94.5 parts to about 50 parts water, the total of solids and water being 100 parts. The solids content consists essentially of, by weight, (a) from about 5 parts to about 45 parts hydrocarbon resin particles (preferably from about 10 parts to about 40 parts) and (b) from about 0.5 part to about 10 parts of a water-soluble cationic polymeric dispersing agent (preferably from about 1 part to about 8 parts). The dispersing agent will be detailed more fully hereinafter. The dispersions of this invention require no dispersing agent other than component (b) dispersing agent.

Hydrocarbon resins employed in this invention are noncrystalline thermoplastic synthetic polymers having a ring and ball softening point of from about 45° C. to about 150° C., preferably from about 50° C. to about 120° C.; a molecular weight within the range of from about 350 to about 2000, preferably from about 400 to 1400; and an acid number of less than about 1. These hydrocarbon resins can be prepared by methods known in the art by homopolymerizing and copolymerizing ethylenically unsaturated hydrocarbon monomers containing only hydrogen and carbon in their molecular structure.

Hydrocarbon resins meeting the above requirements can be derived from liquid petroleum distillates boiling in the range of from about 20° C. to about 280° C., and preferably in the range of about 30° C. to about 140° C., or any fraction boiling within these ranges. Petroleum hydrocarbon resins having the above properties and which are suitable for use in this invention are disclosed and described in U.S. Pat. No. 3,379,663, reference to which is hereby made.

Terpene resins having the above properties can also be employed in carrying out this invention.

In place of cracked petroleum distillates, unsaturated hydrocarbon compounds from other sources, alone or in admixture, can be used. Thus, synthetically derived ethylenically unsaturated hydrocarbons, alone or in admixture with other synthetically derived or naturally occurring ethylenically unsaturated hydrocarbons, can be polymerized to produce hydrocarbon resins for use in this invention. All that is required is that the polymer have properties as above set out. Thus, relatively pure hydrocarbon compounds such as diolefins and olefins can be homopolymerized or can be polymerized in admixture with varying amounts of cyclic diolefins or cyclic olefins, or both, or of substituted benzene hydrocarbons such as styrene, alpha-methyl styrene, vinyl toluene or divinyl benzene to produce resins having the above properties. Various proportions of these unsaturated hydrocarbons of any or all of the classes mentioned above can be mixed with certain fractions of cracked distillates to provide satisfactory materials for resin formation.

Hydrocarbon resins can be prepared by causing the hydrocarbons to react in the presence of a suitable catalyst or activating agent or by the use of heat alone. The catalysts which can be used include acidic catalysts such as $AlCl_3$, $ZnCl_2$, $BF_3$, $H_2SO_4$, $H_3PO_4$ and acid clays, anionic catalysts such as metallic lithium and sodium or their alkyl derivatives, metal coordinate catalysts such as aluminum triisobutyl and $TiCl_4$ or $TiCl_3$, and free radical catalysts such as benzoyl peroxide, cumene hydroperoxide, tertbutyl hydroperoxide, and hydrogen peroxide. Temperatures utilized will vary depending on the monomers and catalysts used and are well known in the art.

After the reaction is essentially complete, any residual catalyst can be removed if required. Unreacted hydrocarbons and low molecular weight materials can be removed by vacuum or steam distillation, if desired.

The following resins are illustrative of hydrocarbon resins that can be used in this invention.

Resin A

A suitable hydrocarbon resin that can be used in this invention is a petroleum resin available commercially under the proprietary designation Piccopale 70. This resin has a ring and ball softening point of about 70° C., a molecular weight of about 800, and an acid number of less than 1.

Resin B

Another suitable petroleum hydrocarbon resin is that available commercially as Piccopale 100. This resin has a ring and ball softening point of about 100° C., a molecular weight of about 1400, and an acid number of less than 1.

Resin C

Another hydrocarbon resin that can be used in this invention is a vinyl toluene-α-methyl styrene copolymer available commercially under the proprietary name Piccotex 120 which has a molecular weight of about 1400 and a ring and ball softening point of about 120° C. The acid number of this resin is less than 1.

Resin D

Another resin that can be used in this invention is a vinyl toluene copolymer that has been hydrogenated to an alpha value at 262 millimicrons of less than 0.05. This resin has a ring and ball softening point of about 135° C. and a molecular weight of about 1400. The acid number of this resin is less than about 1.

Resin E

Another resin that can be used in this invention is a vinyl toluene-α-methyl styrene copolymer available commercially under the proprietary name Piccotex 100. This resin has a molecular weight of about 1100 and a ring and ball softening point of about 100° C. The acid number of the resin is less than 1.

Resin F

Another suitable resin is that available under the proprietary name Petrosin 80, the average molecular weight of which ranges between about 900 and 1000. It has a ring and ball softening point of 80±5° C. Petrosin 80 has an acid number less than 1.

Terpene resins are hydrocarbon resins and, as above set forth, those having the properties above set forth can be used in this invention. *Encyclopedia of Chemical Technology*, Vol. 14, The Interscience Encyclopedia, Inc., New York, 1955, reports that Southern sulfate turpentines are comprised of, by weight, 60% to 65% alpha-pinene and 25% to 35% beta-pinene. Refined Southern sulfate turpentine (200 parts) is added dropwise to an agitated mixture of 450 parts dry toluene and 18 parts aluminum chloride. The temperature during addition is held at 4° C. to 10° C. by cooling. The time of addition is 55 minutes. Reaction is continued at 8°–10° C. for 4 hours after turpentine addition is complete. Water (22° C.) is added with agitation while keeping the temperature below 20° C. Fifteen minutes after water addition is complete, 45 parts calcium hydroxide is added and the mixture is warmed and held at 70° C. for 20 minutes. The hot mixture is filtered and the filter cake is washed with toluene, and the washings are combined with the product filtrate. When the filtrate cools, additional solids form which are separated by an additional filtration. The resulting filtrate is stripped using a heated oil bath for heat. Stripping is stopped at 120 mm. pressure with the oil bath at 200° C. The residue is a soft terpene hydrocarbon resin consisting of polymerization products of terpene hydrocarbons and has a molecular weight of about 500 and a ring and ball softening point of about 75° C. Vacuum topping of this resin provides a residue having a molecular weight of about 840 and a ring and ball softening point of about 115° C.

In preparing aqueous hydrocarbon resin dispersions of this invention the hydrocarbon resin is first dissolved in a water-immiscible organic solvent therefor such, for example, as benzene, xylene, chloroform, and 1,2-dichloropropane. Mixtures of two or more solvents can be used if desired. The selected solvent will also be nonreactive to the components of the aqueous dispersion to be subsequently prepared.

The organic solvent—hydrocarbon resin solution is then mixed with an aqueous solution of cationic resin dispersing agent to provide an emulsion which is essentially unstable and in which the organic solvent—hydrocarbon resin solution forms the dispersed phase. The essentially unstable aqueous emulsion is then subjected to extreme shear to provide an essentially stable aqueous emulsion. Extreme shear is conveniently accomplished by means of an homogenizer. Thus passing, at least once, the unstable aqueous emulsion through an homogenizer under a pressure of the order of from about 1000 p.s.i.g. to about 8000 p.s.i.g., will provide an essentially stable emulsion. Subsequently, the organic solvent component of the emulsion is removed from the emulsion and there is provided an essentially stable aqueous dispersion of hydrocarbon resin particles.

The aqueous hydrocarbon resin dispersions of this invention can be prepared by the inversion process. Thus, the hydrocarbon resin—organic solvent solution is admixed with an aqueous solution of cationic resin dispersing agent in an amount to provide a stable water-in-oil emulsion which is subsequently inverted to a stable oil-in-water emulsion by the rapid addition of water with vigorous stirring. The organic solvent is subsequently removed as by distillation under reduced pressure.

The dispersing agents used to prepare the substantially stable aqueous dispersions of this invention are cationic polymeric resinous materials that are water-soluble.

Particularly suitable dispersing agents are the cationic thermosettable water-soluble aminopolyamide—epichlorohydrin resins disclosed and described in U.S. Pat. Nos. 2,926,116 and 2,926,154. These resins are water-soluble polymeric reaction products of epichlorohydrin and an aminopolyamide. The aminopolyamide is derived by reaction of a dicarboxylic acid and a polyalkylenepolyamine in a mole ratio of polyalkylenepolyamine to dicarboxylic acid of from about 0.8:1 to about 1.4:1.

Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed. Polyalkylene polyamines can be represented as polyamines in which the nitrogen atoms are linked together by groups of the formula $-C_nN_{2n}-$ where n is a small integer greater than unity and the number of such groups in the molecule ranges from two up to about eight. The nitrogen atoms can be attached to adjacent carbon atoms in the group $-C_nH_{2n}-$ or to carbon atoms farther apart, but not to the same carbon atom. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis-(3-aminopropyl)amine; methyl bis-(2-aminoethyl)amine; and 4,7-dimethyltriethylenetetramine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

Temperatures employed for carrying out reaction between the dicarboxylic acid and the polyalkylene polyamine can vary from about 110° C. to about 250° C. or higher at atmospheric pressure. For most purposes temperatures between about 160° C. and 210° C. are preferred. The time of reaction will usually vary from about ½ hour to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used. The aminopolyamide, derived as above described, is reacted with epichlorohydrin at a temperature of from about 45° C. to about 100° C., and preferably between about 45° C. and 70° C., until the viscosity of a 20% solids solution in water at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to about 50%.

In the aminopolyamide--epichlorohydrin reaction, satisfactory results can be obtained utilizing from about 0.1 mole to about 2 moles of epichlorohydrin for each secondary or tertiary amine group of the aminopolyamide, and preferably from about 1 mole to about 1.5 moles of epichlorohydrin.

A monofunctional alkylating agent can be employed as an additional reactant in carrying out the above reaction, if desired. A monofunctional alkylating agent can be first reacted with the aminopolyamide followed by reaction of the aminopolyamide— alkylating agent reaction product with epichlorohydrin, or the alkylating agent can be reacted with the aminopolyamide—epichlorohydrin reaction product. Thus, for example, epichlorohydrin can be added to an aqueous solution of the aminopolyamide at a temperature from about 45° C. to 55° C. The reaction mixture is then heated at a temperature from about 50° C. to 100° C., and preferably from about 60° C. to 80° C., depending upon the rate of reaction desired. After a suitable time at this temperature, i.e., from about 10–100 minutes, and preferably until the viscosity of an approximately 25% solids solution of the reaction mixture at 25° C. is from A to B on the Gardner-Holdt scale, at which time most of the epoxy groups of the epichlorohydrin have reacted with the amine groups of the aminopolyamide, a monofunctional alkylating agent is added and the reaction mixture heated, preferably at a temperature from about 60° C. to about 80° C., until the viscosity of an approximately 25% solids solution at 25° C. is at least A and preferably at least B to C on the Gardner-Holdt scale. The solids-viscosity relationship can be obtained by direct reaction at the 25% level followed by dilution to 25% solids, or reaction at a lower level followed by concentration at less than 40° C. and under reduced pressure to 25% solids. Lower alkyl esters of mineral acids such as the halides, sulfates and phosphates, substituted alkyl halides, and the like are suitable monofunctional alkylating agents. Illustrative of the compounds which can be used are dimethyl, diethyl and dipropyl sulfate; methyl chloride; methyl iodide; ethyl iodide; methyl bromide; propyl bromide; and the mono-, di- or tri-methyl, ethyl and propyl phosphates. Certain aromatic compounds such as benzyl chloride and methyl p-toluene sulfonate can be used. From about 0.1 mole to about 0.9 mole of mono-functional alkylating agent for each amine group can be used.

In the examples that follow, all parts and percentages are by weight unless otherwise specified. Sizing results are set forth in some of the examples. Sizing results are determined on the Hercules Sizing Tester. The sizing test determines the resistance of a sized sheet of paper to penetration by No. 2 Test Solution, (an aqueous solution of, by weight, 1.0% formic acid and 1.25% naphthol Green B). The time necessary for ink penetration to reduce light reflectance either 80% or 85% (as indicated in the examples) of the sheet's initial value is used to represent the degree of sizing.

The two examples that follow are illustrative of the preparation of an aminopolyamide--epichlorohydrin resin, said resin being useful as a cationic resin dispersing agent in this invention.

EXAMPLE 1

An aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170°–180° C. under a nitrogen blanket until amide formation is complete. After air cooling to approximately 140° C., hot water is added with stirring to provide a 50% solids solution of polyamide resin with an intrinsic viscosity of 0.140 measured by using a 2% solution in 1 N $NH_4Cl$. An epichlorohydrin derivative of the aminopolyamide is prepared by adding about 150 parts of water to about 50 parts of the 50% solids solution and then adding 13.7 parts (0.149 mole) of epichlorohydrin. The reaction mixture is heated at 70° C. with stirring under a reflux condenser until the Gardner-Holdt viscosity attains a value of D. The reaction mixture is diluted with water to a solids content of about 10%.

EXAMPLE 2

An aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170°–180° C. under a nitrogen blanket until amide formation is complete. After air cooling to approximately 140° C., hot water is added with stirring to provide a 50% solids solution of polyamide resin with an intrinsic viscosity of 0.140 measured by a 2% solution in 1 N $NH_4Cl$. An epichlorohydrin derivative of the aminopolyamide is prepared by adding about 110.25 parts of water to about 50 parts of the 50% solids solution and then adding 14.4 parts (0.157 mole) of epichlorohydrin. The reaction mixture is heated at 70°–75° C. with stirring under a reflux condenser until the Gardner-Holdt viscosity attains a value of about E to F. The reaction mixture is diluted with water to a solids content of about 12.5%.

Other suitable dispersing agents that can be used in this invention are the water-soluble alkylene polyamine—epichlorohydrin resins which are water-soluble polymeric reaction products of epichlorohydrin and an alkylene polyamine.

Alkylene polyamines which can be reacted with epichlorohydrin have the formula $H_2N(C_nH_{2n}NH)_xH$ wherein $n$ is an integer 2 through 8 and $x$ is an integer 1 or more, preferably 1 through 6. Examples of such alkylene polyamines are the alkylene diamines such as ethylenediamine; propylene diamine-1,2; propylene diamine-1,3; tetramethylenediamine; and hexamethylenediamine. The polyalkylene polyamines such as the polyethylene polyamines, polypropylene polyamines, polybutylene polyamines and the like are examples of alkylene polyamines that can be used. Specific examples of these polyalkylene polyamines include diethylenetriamine, triethylenetetramine, tetraethylenepentamine, and dipropylenetriamine. Other polyalkylene polyamines that can be used include methyl bis(3-aminopropyl)amine; methyl bis(2-aminoethyl)amine; and 4,7-dimethyltriethylenetetramine. Mixtures of alkylene polyamines can be used if desired.

The relative proportions of alkylene polyamine and epichlorohydrin employed can be varied depending upon the particular alkylene polyamine used. In general, it is preferred that the molar ratio of epichlorohydrin to alkylene polyamine be in excess of 1:1 and less than 2:1. In the preparation of a water-soluble resin from epichlorohydrin and tetraethylenepentamine, good results are obtained at molar ratios of from about 1.4:1 to 1.94:1. Reaction temperature is preferably in the range of from about 40° C. to about 60° C.

The following example illustrates the preparation of a dispersing agent of the above type.

EXAMPLE 3

To a mixture of 29.2 parts triethylenetetramine and 70 parts water is added 44.4 parts epichlorohydrin over a period of about 12 minutes with periodic cooling. After the epichlorohydrin addition is complete, the reaction mixture is heated to 75° C. and maintained at a temperature of from about 70° C. to about 77° C. for about 33 minutes, at which point the Gardner-Holdt viscosity reached about I. The resulting reaction mass is diluted with 592 parts water to provide an aqueous solution that has a solids content of about 11.7% and a pH of about 6.3.

Another suitable dispersing agent for use in this invention is a poly(diallylamine)—epihalohydrin resin. Resins of this type can be prepared in accordance with the teachings of patent 3,700,623, reference to which is hereby made.

A poly(diallylamine)—epihalohydrin resin is the resinous reaction product of (A) a linear polymer having units of the formula

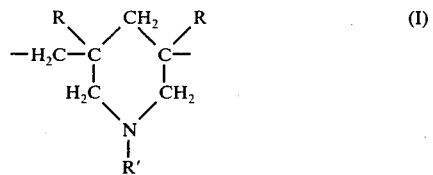

where R is hydrogen or lower alkyl and R' is hydrogen, alkyl or a substituted alkyl group and (B) an eiphalohydrin.

In the above formula, each R can be the same or different and, as stated, can be hydrogen or lower alkyl. The alkyl groups contain from 1 to 6 carbons and are preferably methyl, ethyl, isopropyl or n-butyl. R' of the formula represents hydrogen, alkyl or substituted alkyl groups. The R' alkyl groups will contain from 1 to 18 carbon atoms (preferably from 1 to 6 carbon atoms) such as methyl, ethyl, propyl, isopropyl, butyl, tertbutyl, hexyl, octyl, decyl, dodecyl, tetradecyl, and octadecyl. R' can also be a substituted alkyl group. Suitable substituents include, in general, any group which will not interfere with polymerization through a vinyl double bond. Typically, the substituents can be carboxylate, cyano, ether, amino (primary, secondary or tertiary), amide, hydrazide and hydroxyl.

Polymers having units of the above formula can be produced by polymerizing the hydrohalide salt of a diallylamine

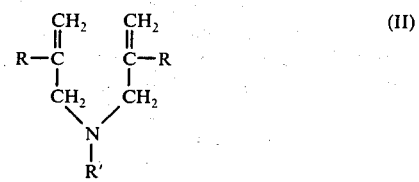

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride; N-methyldiallylamine hydrochloride; N-methyldiallylamine hydrobromide; 2,2'-dimethyl-N-methyldiallylamine hydrochloride; N-ethyldiallylamine hydrobromide; N-isopropyldiallylamine hydrochloride; N-n-butyldiallylamine hydrobromide; N-tert-butyldiallylamine hydrochloride; N-n-hexyldiallylamine hydrochloride; N-octadecyldiallylamine hydrochloride; N-acetamidodiallylamine hydrochloride; N-cyanomethyldiallylamine hydrochloride; N-$\beta$-propionamidodiallylamine hydrobromide; N-carboethoxymethyldiallylamine hydrochloride; N-$\beta$-methoxyethyldiallylamine hydrobromide; N-$\beta$-aminoethyldiallylamine hydrochloride; N-hydroxyethyldiallylamine hydrobromide; and N-acetohydrazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N-methyldiallylamine can be prepared by reaction of two moles of an allyl halide, such as allyl chloride, with one mole of methylamine in the presence of an ionization catalyst such as one of those enumerated above.

In preparing the homopolymers and copolymers, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin can contain different units of formula (I) and/or contain units of one or more other copolymerizable monomers. Typically the comonomer is a different diallylamine, a monoethylenically unsaturated compound containing a single vinyl or vinylidene group or sulfur dioxide, and is present in an amount ranging from 0 to 95 mole % of the polymer. Thus the polymers of diallylamine are linear polymers wherein from 5% to 100% of the recurring units have the formula (I) and from 0 to 95% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallyl amine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The poly(diallylamine)—epihalohydrin resin can be prepared by reacting a homopolymer or copolymer of a diallylamine as set forth above with an epihalohydrin at a temperature of from about 30° C. to about 80° C. and preferably from about 40° C. to about 60° C. until the viscosity measured on a solution containing 20% to 30% solids at 25° C. has reached a range of A to E and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25° C.).

The poly(diallylamine)—epihalohydrin resin can be stabilized against gelation by adding to the aqueous solution thereof sufficient water-soluble acid (such as hydrochloric acid and sulfuric acid) to obtain and maintain the pH at about 2.

The following example illustrates the preparation of a poly(diallylamine)—epichlorohydrin resin.

EXAMPLE 4

A solution of 69.1 parts of methyldiallylamine and 197 parts of 20° Be hydrochloric acid in 111.7 parts of demineralized water is sparged with nitrogen to remove air, then treated with 0.55 part of tertiary butyl hydroperoxide and a solution of 0.0036 part of ferrous sulfate in 0.5 part of water. The resulting solution is allowed to polymerize at 60°–69° C. for 24 hours to give a polymer solution containing about 52.1% solids with an RSV of 0.22. 122 parts of the above solution is adjusted to pH 8.5 by the addition of 95 parts of 3.8% sodium hydroxide and then diluted with 211 parts of water and combined with 60 parts of epichlorohydrin. The mixture is heated at 45°–55° C. for 1.35 hours until the Gardner-Holdt viscosity of a sample cooled to 25° C. reaches B+. The resulting solution is acidified with 25 parts of 20° Be hydrochloric acid and heated at 60° C. until the pH becomes constant at 2.0. The resulting resin solution has a solids content of 20.8% and a Brookfield viscosity = 77 cp. (measured using a Brookfield Model LVF Viscometer, No. 1 spindle at 60 r.p.m. with guard).

The following examples are illustrative of the preparation of the aqueous dispersions of this invention.

EXAMPLE 5

A solution is prepared by dissolving 300 parts Resin F in 300 parts benzene. This solution is thoroughly mixed with 500 parts (50 parts solids) of an epichlorohydrin modified aminopolyamide resin solution prepared as in Example 1 diluted with 250 parts of water providing a premix which is homogenized twice at 3000 p.s.i. The resulting product is a stable oil-in-water emulsion from which substantially all of the benzene is subsequently removed by distillation to a maximum pot temperature of about 100° C. The solids content of the resulting stable suspension is about 35% (30% Resin F and 5% epichlorohydrin modified aminopolyamide resin). The dispersion is applied to 40 lb./3000 ft.$^2$ bleached kraft waterleaf paper in a size press in an amount sufficient to provide about 0.61% (dispersion solids) based on the weight of the paper and the thus treated paper drum dried. Hercules sizing test results show 240 seconds.

EXAMPLE 6

A solution is prepared by dissolving 300 parts Resin E in 300 parts benzene. This solution is thoroughly mixed with 400 parts (50 parts solids) of an eipichlorohydrin modified aminopolyamide resin solution prepared as in Example 2 diluted with 350 parts of water providing a premix which is homogenized twice at 3000 p.s.i. The resulting product is a stable oil-in-water emulsion from which substantially all of the benzene subsequently is removed by distillation to a maximum pot temperature of about 100° C. The solids content of the resulting stable suspension is about 35% (about 30% Resin E and about 5% epichlorohydrin modified aminopolyamide resin).

It is to be understood that the above description and examples are illustrative of this invention and not in limitation thereof.

What I claim and desire to protect by Letters Patent is:

1. In the method of sizing paper wherein a hydrocarbon resin is applied to paper fibers in the process of preparing sized paper, the improvement wherein there is employed in the sizing of the paper an essentially stable aqueous hydrocarbon resin dispersion consisting essentially of, by weight, from about 5.5 parts to about 50 parts solids and from about 94.5 parts to about 50 parts water; the solids content consisting essentially of, by weight, (a) from about 5 parts to about 45 parts hydrocarbon resin particles and (b) from about 0.5 part to about 10 parts of a water-soluble cation polymeric dispersing agent, component (a) being a hydrocarbon resin from ethylenically unsaturated hydrocarbon monomers having a ring and ball softening point of from about 45° C. to about 150° C., a molecular weight of from about 350 to about 2000, and an acid number of less than about 1, component (b) being selected from the group consisting of (i) a water-soluble polyaminopolyamide--epichlorohydrin resin, (ii) a water-soluble alkylenepolyamine--epichlorohydrin resin and (iii) a water-soluble poly(diallylamine)---epichlorohydrin resin.

2. In the method of sizing paper wherein a hydrocarbon resin is applied to paper fibers in the process of preparing sized paper, the improvement wherein there is employed in the sizing of the paper an essentially stable aqueous hydrocarbon resin dispersion consisting essentially of, by weight, from about 5.5 parts to about 50 parts solids and from about 94.5 parts to about 50 parts water; the solids content consisting essentially of, by weight, (a) from about 10 parts to about 40 parts hydrocarbon resin particles and (b) from about 1 part to about 8 parts of a water-soluble cation polymeric dispersing agent, component (a) being a hydrocarbon resin from ethylenically unsaturated hydrocarbon monomers having a ring and ball softening point of from about 45° C. to about 150° C., a molecular weight of from about 350 to about 2000, and an acid number of less than about 1, component (b) being selected from the group consisting of (i) a water-soluble polyaminopolyamide—epichlorohydrin resin, (ii) a water-soluble alkylenepolyamine—epichlorohydrin resin and (iii) a water-soluble poly(diallylamine)—epichlorohydrin resin.

3. The method of claim 2 wherein (a) of the aqueous dispersion is a hydrocarbon resin having a ring and ball softening point of from about 50° C. to about 120° C., a molecular weight of from about 400 to about 1400, and an acid number less than about 1.

4. The method of claim 3 wherein (b) of the aqueous dispersion is a water-soluble polyaminopolyamide—epichlorohydrin resin.

5. The method of claim 4 wherein the polyaminopolyamide moiety of the resin is from adipic acid and diethylenetriamine.

6. The method of claim 3 wherein (b) of the aqueous dispersion is a water-soluble alkylenepolyamine—epichlorohydrin resin.

7. The method of claim 3 wherein (b) of the aqueous dispersion is a water-soluble poly(diallylamine)—epichlorohydrin resin.

* * * * *